INVENTOR
NORMAN G. HORNING
BY Cushman, Darby & Cushman
ATTORNEYS

INVENTOR
NORMAN G. HORNING
BY Cushman, Darby & Cushman
ATTORNEY

United States Patent Office
3,451,049
Patented June 17, 1969

3,451,049

SKEW CORRECTION ARRANGEMENT FOR PARALLEL TRACK READOUT DEVICES

Norman G. Horning, Minneapolis, Minn., assignor to Control Data Corporation, South Minneapolis, Minn., a corporation of Minnesota Filed Jan. 19, 1966, Ser. No. 521,690
Int. Cl. G11b *5/00*
U.S. Cl. 340—174.1 5 Claims

ABSTRACT OF THE DISCLOSURE

An arrangement for compensating for skew in data read-out from a multi-track recording medium. Data from each track is stepped through a multi-stage register system associated with that track at a pace independent of the stepping in the other register systems. When data has arrived at the last stage of all the registers, a coincidence circuit connected to these last stages is enabled to effect a parallel read-out of data from each system.

This invention relates to skew correcting circuits for the realignment of data pulses read from a plurality of parallel tracks from a storage area, and, in particular, this invention relates to apparatus for deskewing parallel high-density data which is self-clocked along each track.

A self-clocked system is one which provides an input signal, ONE or ZERO for each time period. This contrasts with some systems which provide all ONE's for data and all ZERO's for the absence of data.

In information storage systems, such as tape recording systems, generally, a plurality of parallel tracks or channels are disposed along the tape to provide a storage area. In order to store information on these channels, magnetic heads are disposed respectively beside each of the channels. A single character of data is stored on these parallel channels, by simultaneously writing on all channels, with each channel being responsive to one bit position of the character. One or more characters of data will make up a block of data. Because of physical displacement of the magnetic heads with respect to each other, the data is generally physically skewed with respect to the direction transverse to the lengthwise axis of the tape. This skewed effect of the data may be increased when the data is read back from the tape to be processed. As the need for storing more information within storage mediums increases, this necessarily results in high-density packing of information along each of the tracks of the storage medium, which in turn, results in the skew problem becoming serious. It is important that the skew between the bits comprising a given character of data be eliminated since the data processor assumes that all bits of a given character are available at the same time.

It is an object of this invention to provide an improved apparatus for deskewing parallel high-density data which is self-clocked.

It is an object of this invention to provide improved apparatus for inhibiting non-significant data pulses from entering deskewing circuitry for self-clocked data when a phase-modulated system is employed.

It is also an object of this invention to provide an improvide data deskewing apparatus for self-clocking systems where the data moves through the deskewer asynchronously.

Other objects and advantages of this invention will become apparent to those of ordinary skill in the art upon reading the appended claims and the following detailed description of an illustrative embodiment of the invention, in conjunction with the drawings, in which:

Figure 1:
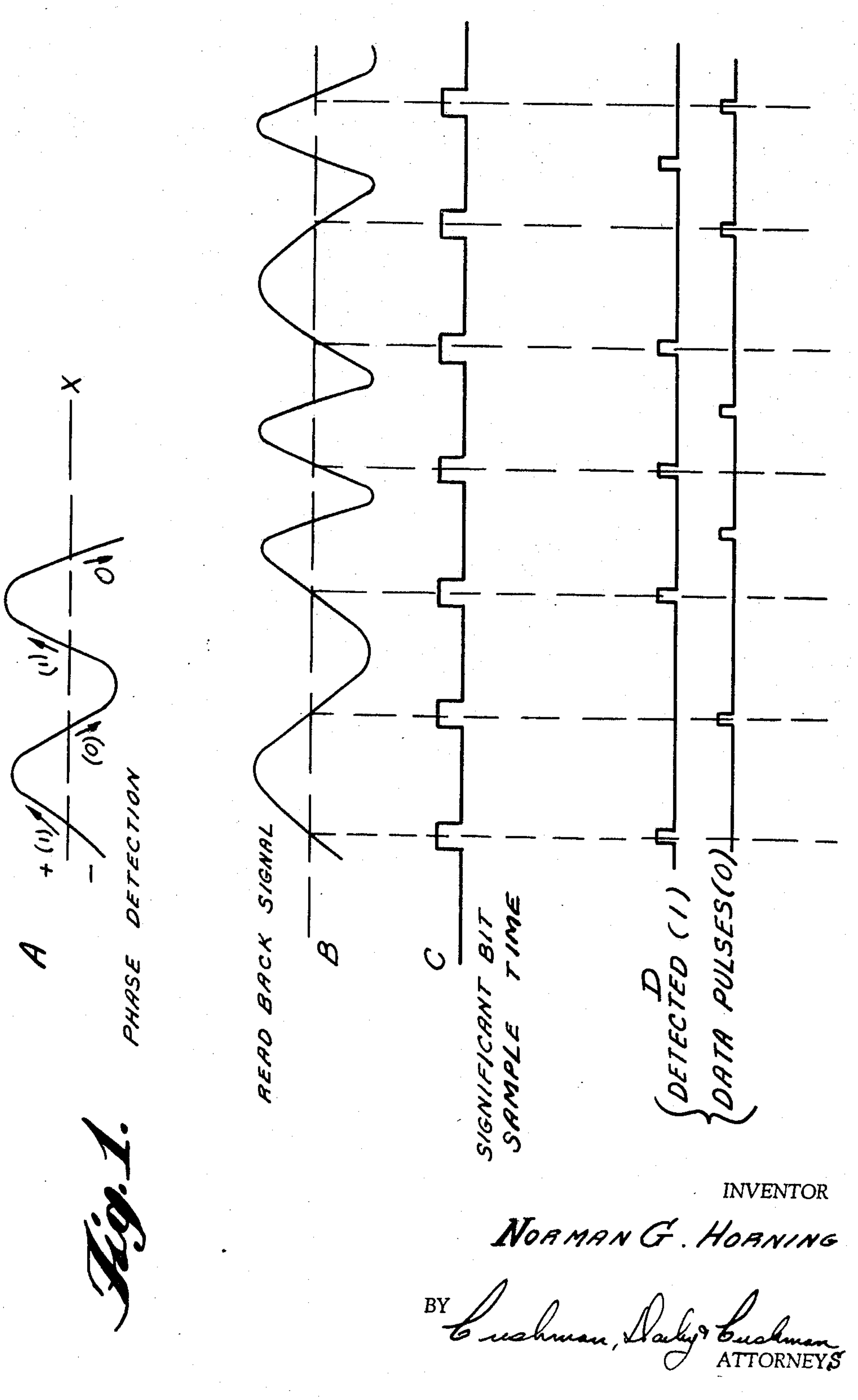
FIGURE 1 illustrates typical phase-modulated signals employed in a phase-modulated, self-clocked data system.

Reference should now be made to FIGURE 1 which illustrates the waveforms used in a self-clocked data system, which may be a phase-modulated system. In a phase-modulated system, ONE's and ZERO's are represented by readback signals which swing above and below a predetermined level (the $x$ axis) with ONE's assumed to be signals which cross the predetermined level in one direction, while ZERO's cross the predetermined level in the opposite direction. For purposes of further illustration, ONE's will be detected whenever the readback signal moves in a negative to positive direction, and ZERO's whenever the readback signal moves in a positive to negative direction, as shown in FIGURE 1A.

A typical phase-modulated readback signal, such as might be received from a magnetic tape unit, is illustrated in FIGURE 1B. The time at which the readback signal is sampled to check for significant data pulses is illustrated in FIGURE 1C. Note that the sample time occurs once for each period or cell time. All of the data pulses which are detected are shown in FIGURE 1D. Note that there is a significant data pulse, ONE or ZERO, at each sample time, and sometimes a non-significant data pulse, ONE or ZERO, in between the sample times. Whether a non-significant data pulse will be present depends upon the adjacent significant pulses. If there are two identical adjacent significant pulses, such as consecutive ONE's, there will be a non-significant pulse, ZERO in this case, between them. The necessity of the non-significant pulses is apparent if FIGURES 1B and 1A are studied, since if there are to be two identical adjacent significant pulses, there must be a signal between them to reverse the polarity of the readback signal.

Figure 2:
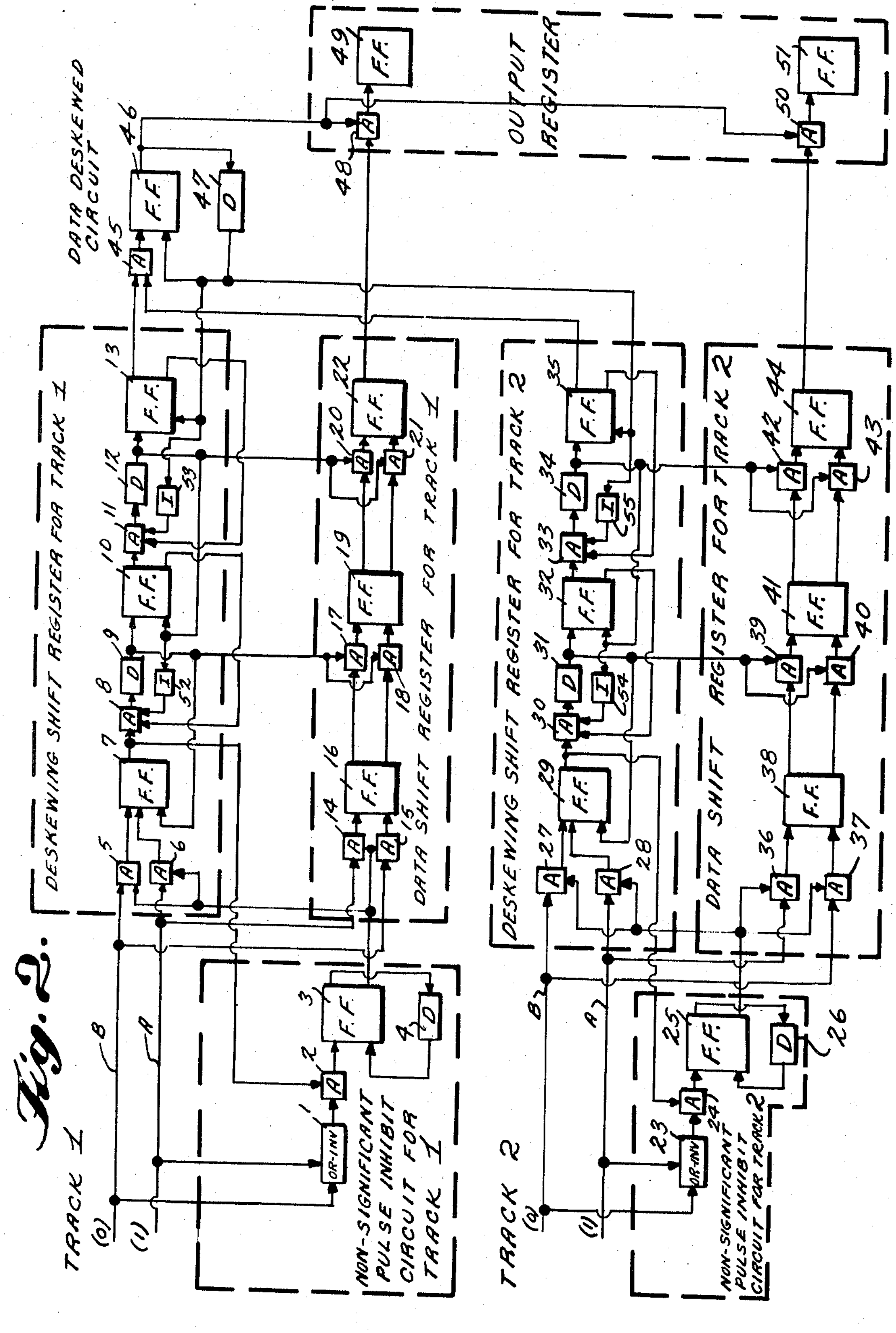
FIGURE 2 is a block diagram of an illustrative embodiment of deskewing circuitry used in the invention.

FIGURE 2 illustrates the deskewing logic for two data tracks. There are three sections of logic for each track. The first section's purpose is to inhibit the non-significant pulses from entering the remainder of the deskewing logic. The next section is the deskewing shift register. The first stage of this register can be set by any significant data pulse, whether ZERO or ONE, and thus will be set at the start of each period since there is always a ZERO or ONE at this time. The third section is the data shift register. A significant ONE data pulse will set the first stage of this register, while a ZERO will clear it. The transfer of data between stages of the data shift register is controlled by the deskew shift register. On any one track, data transfers to the last stage where it is stored until data deskewed is detected. Information is handled on an independent, single track, asynchronous basis until the last stage of every deskew register is set. At this time, data deskewed is detected and the data is gated out in parallel to an output register to form a parallel character of data. While this gating out occurs, information in the individual tracks can be processed to deskew the next character.

The maximum skew which can be tolerated is dependent upon the number of stages in the deskew register. In FIGURE 2, three stages are used and thus, the maximum skew would be three data periods. Of course, the number of stages used in practice will vary depending on the maximum skew that can be expected in a given application.

Associated with each of the tracks 1 and 2 of FIGURE 2 are two data lines A and B. For each track, one of the lines (A in FIGURE 2) will recurrently provide data pulses, where each pulse represents a logical ONE (as shown in FIGURE 1D) and the other of said lines (B in FIGURE 2) will recurrently provide significant data pulses, where each pulse represents a logical ZERO (as shown also in FIGURE 1D).

The deskewing circuitry associated with track 1 is, for the most part, the same as that associated with track 2, and, therefore, the description given for track 1 will also cover track 2 insofar as the circuitry associated with these two tracks is the same. Referring first to the non-significant pulse inhibit circuitry, the ONE data line A and the ZERO data line B are both connected to an OR-inverter circuit 1, the output of which is connected to an AND circuit A2. The AND circuit A2 is also connected to and controlled by the SET output of flip-flop FF7, so that the set output of FF7 will SET flip-flop FF3 at the end of a data pulse. A delay circuit D4 clears or resets FF3 after a delay which must be greater than 50% and which is approximately 70% of the data period established by the sample time shown in FIGURE 1C.

AND circuits A5 and A6 are conditioned to set FF7 by the CLEAR output of FF3 whenever a data pulse occurs on either of the data lines 1A or 1B. AND circuits A14 and A15 are also conditioned to respectively SET or CLEAR flip-flop FF16 whenever data pulses respectively occur on the data lines 1A and 1B.

When FF7 of the deskewing shift register for track 1 is SET, a conditioning voltage is placed on AND circuit A8. AND circuit A8 is also conditioned by the CLEAR output from flip-flop FF10 and the output from inverter I52. The output from A8 is applied to a delay circuit D9, the output of D9 being applied to the SET input of FF10. The output from D9 is also applied to the CLEAR input of FF7 and to the AND gates A17 and A18, thereby controlling the transfer of data from FF16 to flip-flop FF19.

The AND circuit A8 permits asynchronous flow of data through the data shift register since as long as the succeeding stage FF10 and the preceding stages FF7 are respectively cleamed and set as determined by A8 data can be transferred from FF16 to FF19.

From the foregoing description of the deskewing or first shift register and the data or second shift register for track 1, it can be seen that each of these registers comprises a plurality of successive stages (the deskewing shift register comprising flip-flops FF7, 10 and 13 and the data shift register comprising flip-flops FF16, 19 and 22) where each stage of the deskewing shift register is associated with a stage of the data shift register, and successive stages of the deskewing shift register control the transfer of data pulses between successive stages in the data shift register.

The SET output from FF10 applies a conditioning voltage to AND circuit A11 in a manner similar to that described for A8. AND circuit A11 is also conditioned by the CLEAR output of the flip-flop FF13, together with the output from inverter I53. The purpose of the inverters I52 and I53 is to respectively prevent SET and CLEAR pulses from being applied simultaneously to FF10 and FF13. The output from A11 passes through delay D12, the output from delay D12 being applied to the SET input of FF13, the CLEAR input of flip-flop 10, the input of inverter I52 and the conditioning inputs of AND circuits A20 and A21. The transfer of data from flip-flop FF19 to flip-flop FF22 is controlled by the gate developed at the output of delay circuit D12.

Track 2 also has associated therewith a nonsignificant pulse inhibit circuit, a deskewing shift register, and a data shift register, each of these circuits preferably being constructed as described hereinbefore with respect to track 1.

AND circuit A45 is connected ot the SET outputs of flip-flops FF13 and FF35. These two flip-flops are SET only after the data within tracks 1 and 2 has been deskewed. That is, the data pulses in tracks 1 and 2 may be thought of as a character of data pulses, the character in this instance, comprising two data pulses where each data pulse is read from one of the two tracks of storage medium—for instance, a magnetic tape. Each of the tracks will provide recurrent data pulses where each of the pulses are respectively associated with different characters of data. As noted before, there may be considerable skew between the two pulses comprising the data character. Another way of looking at this is that there may be considerable time lapse between the setting of the last register FF13 of the deskewing shift register associated with track 1 (which indicates that the data pulse associated with track 1 has been deskewed) and the setting of the last register FF35 of the deskewing shift register associated with track 2 (which also indicates that the data associated with this particular track has been deskewed).

The output of AND circuit A45 is applied to the SET input of flip-flop FF46. The SET output of flip-flop FF46 is applied to a delay circuit D47 and AND gates A48 and A50. AND gates A48 and A50 are connected to the SET outputs of flip-flops FF22 and FF44 respectively. The output of AND circuits A48 and A50 are applied to the SET inputs of flip-flops FF49 and FF51. The flip-flops FF49 and FF51 comprise an output register which is loaded in parallel (the skew having been removed).

The output from D47 is applied to the CLEAR inputs of FF13 and FF35 and to the inputs of I53 and I55.

The operation of the deskewing logic shown in FIGURE 2 will now be described.

The operation of the deskewing circuitry associated with track 1 will be described first. First assume that all flip-flops are cleared. Data pulses, ZERO or ONE, are sensed by A5 and A6. If FF3 is cleared, FF7 in the deskewing register will set. FF3 is self clearing after a delay of D4, which is set equal to approximately 70% of a data period or cell time, and consequently, FF3 will be cleared at the start of data flow. FF3's function is to inhibit the non-significant pulses, so D4 must be greater than 50% but less than 100% of a period or cell time. Thus, when the first data pulse is sensed, FF7 will set, enabling A2 so that FF3 will set at the end of the data pulse. If the data pulse were a ONE, FF16 in the data register would set also. With FF7 set with FF10 cleared, A8 will have the required conditions for an output. (The output of inverter I52 will be ONE, when all the logic is cleared.) Delay D9 is some short delay which provides sufficient time for the logic elements to stabilize and also is long enough to provide a gate pulse. An output from D9 will set FF10, clear FF7 and also enable A17 and A18, thus transferring the content of FF16 to FF19. With FF10 set and FF13 cleared, A11 will be made and after a delay, D12 will set FF13, clear FF10, and enable A20 and A21, thus gating the content of FF19 to FF22. With FF13 set, one of the inputs to A45 is enabled, but the other input from FF35 may not yet be present, and the information in FF13 and FF22 will be stored until the fact that all data is deskewed is detected. Therefore, as illustrated by the waveforms of FIGURE 3, if track 2 data is late arriving, the logic for track 1 would accept the next data pulse and asynchronously transfer it until it reached FF10 and FF19 where it would be stored.

Figure 3:
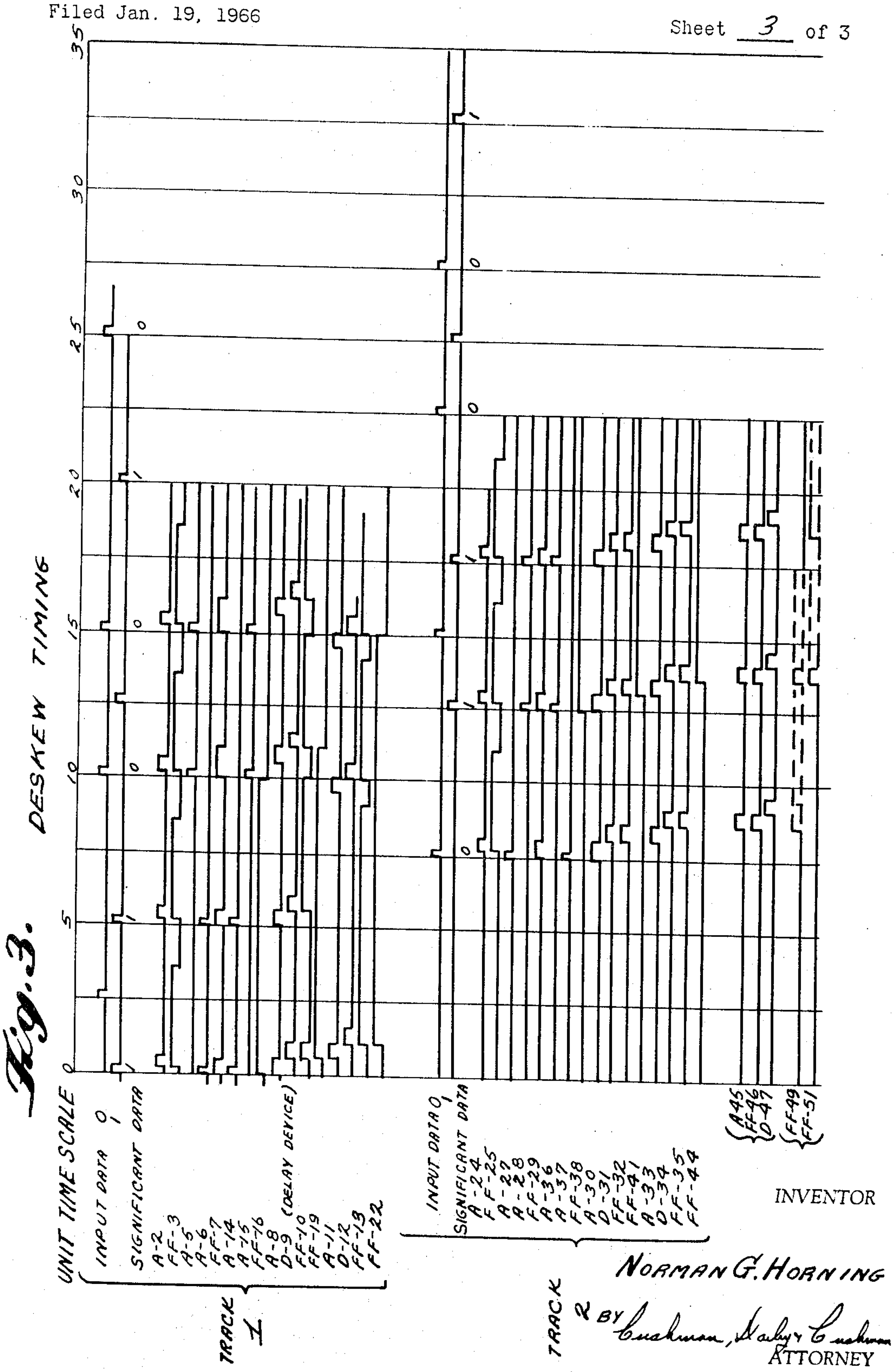
FIGURE 3 illustrates the timing waveforms which occur at the elements shown in FIGURE 2.

Reference should now be made to FIGURE 3, which illustrates a skew between the two tracks of approximately 1.5 periods, track 2 being late. Again, the data for track 2 is handled on a single track basis and is asynchronously transferred to the last stages of the deskew and data registers, FF35 and FF44 respectively. As soon as FF35 sets, A45 will be made setting FF46 (Data Deskewed) which in turn enables A48 and A50, to gate the deskewed data into the output register. Delay D47 establishes the width of this gate pulse and then clears FF46, FF13, and FF35. With FF13 and FF35 cleared, both tracks can advance any data stored in them as soon as the output of D47 drops, and prepare to receive the next input pulse.

If more than two tracks are involved, the deskewing logic for each track must be added, i.e., non-significant inhibit, deskewing register, and data register. The outputs of the final stage of each deskewing register must be connected to A45, to detect data deskewed.

The skew between any two tracks can be measured by observing the time difference between the time that the last stage of the deskew register in one track sets and the time that the corersponding stage or the other track sets. This information is desirable to determine if the skew in the system is aproaching the maximum skew which can be tolerated. If so, proper remedial measures can be taken.

In the broad sense of the word, the term "character" as used in the specification and claims, may refer to any block of data having bits substantially arranged in parallel.

Thus, there has been described deskewing circuitry, the data flow for a track being serial and asynchronous through a data shift register, and then in parallel with the other tracks to an output register.

Other objects and advantages, and even further modifications of the invention, will become apparent to those of ordinary skill in the art upon reading this disclosure. However, it is to be understood that this disclosure is illustrative of the invention, and not limitative thereof, the invention being defined by the appended claims.

What is claimed is:

1. Apparatus for eliminating the skew between data pulses of a character of data pulses read from a plurality of tracks of a storage medium, each of said tracks providing recurrent data pulses respectively associated with different characters of data, said apparatus comprising:

two data lines associated with each of said tracks, one of said lines recurrently providing data pulses which represent a logical ONE and the other of said lines recurrently providing data pulses which represent a logical ZERO;

separate multi-stage shift registers, each register being related to a respective track by connection to the two data lines associated with that track, the successive stages of said register being set by data pulses from either of the lines connected thereto to control the sequential storage of said recurrent pulses in a data pulse storage means associated with each track;

each of said data pulse storage means comprising an additional multi-stage shift register connected to the two data lines associated with the respective track, the stages of said additional shift register being set by data pulses from said ONE line and being respectively associated with the stages of the corresponding first-mentioned shift register such that each stage of the first-mentioned shift register controls the transfer of data pulses from the associated stage of the additional shift register; and means connecting the last stage of each of the first-mentioned shift registers to a device for gating data pulses in parallel out of said storage means.

2. Apparatus as in claim 1 where said last stage of each of said first-mentioned shift registers upon being set indicates when a data pulse is stored in the last stage of its associated additional shift register thereby indicating that said data pulse has been deskewed.

3. Apparatus as in claim 2 where said output gating device includes a coincidence circuit which is made when all of the last stages of said first-mentioned shift registers are set, said coincidence circuit generating upon being made a gating signal which transfers said character of data pulses out of the last stages of said additional shift registers.

4. Apparatus as in claim 1 where one or the other said data pulses on said one or said other data lines occur periodically, and where non significant pulses occur approximately half-way between said periodically occurring data pulses, said apparatus including:

means for inhibiting the response of said first-mentioned additional shift registers to any pulses for over approximately one-half of the said period commencing from the beginning of the period thereby inhibiting the effect of said non-significant pulses.

5. Apparatus as in claim 1 where each first-mentioned shift register includes means connected between any two stages thereof for setting the succeeding stage in response to the preceding stage being set and the succeeding stage being cleared, each said setting means also being respectively connected to each additional shift register thereby permitting asynchronous data flow in each said additional shift register.

References Cited

UNITED STATES PATENTS

| | | | |
|---|---|---|---|
| 2,937,366 | 5/1960 | Sims | 340—174.1 |
| 3,154,762 | 10/1964 | Morphet | 340—174.1 |
| 3,197,739 | 7/1965 | Newman | 340—174.1 |
| 3,273,120 | 9/1966 | Dustin et al. | 340—174.1 |
| 3,281,805 | 10/1966 | Perry | 340—174.1 |
| 3,286,243 | 11/1966 | Floros | 340—174.1 |

BERNARD KONICK, *Primary Examiner.*

VINCENT P. CANNEY, *Assistant Examiner.*